United States Patent Office 3,473,559
Patented Oct. 21, 1969

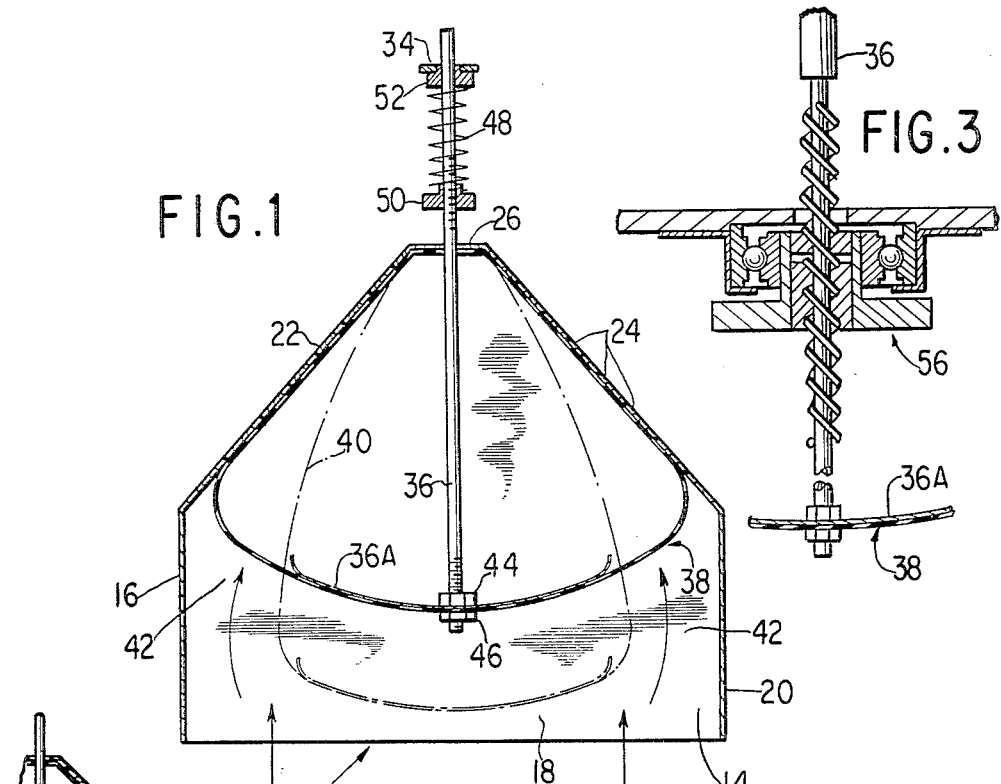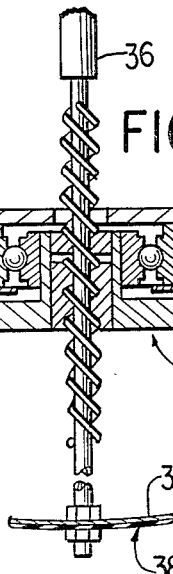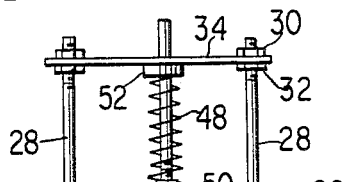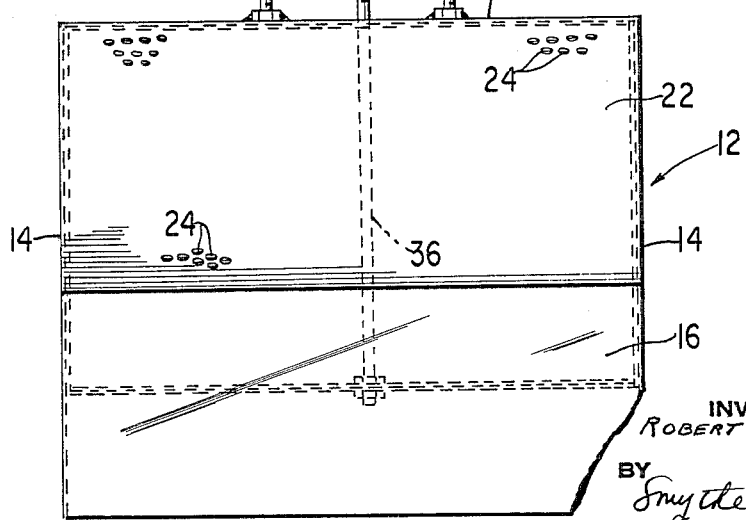

3,473,559
FLUID CONTROL DEVICE
Robert M. Warren, Jr., Lincroft, N.J., assignor, by mesne assignments, to Aeronca, Inc., Middletown, Ohio, a corporation of Ohio
Filed Aug. 29, 1967, Ser. No. 664,104
Int. Cl. F16k *21/10;* F23l *17/00*
U.S. Cl. 137—514                                      6 Claims

ABSTRACT OF THE DISCLOSURE

Airflow control device for maintaining constant volume and including a balloon-like valve arrangement cooperating with valve plates and being operable by airflow or pressure difference.

---

The present invention relates to a fluid control device and more particularly to such a device for maintaining a substantially constant volume of air flowing through an air duct or passage such as the air delivery passages or ducts used in air conditioning systems wherein the air flows from a central conditioning apparatus to a plurality of individual distributing units.

In such air conditioning systems, there is a pressure variation in air delivery ducts because of the irregular and changing air demands in the individual rooms that are air conditioned, and it is known that a changing rate of air delivery in such systems is a contributing cause to objectionable audible noises that commonly accompany the operation of known air distributing units.

One of the objects of the present invention is to provide an improved flow control device responding to the upstream pressure for maintaining with stability the flow of fluid or air throughout the system as designed or as adjusted for best results.

It is another object of the present invention to provide a volume or flow control device that is responsive to upstream pressures for maintaining a constant flow of air through a passage, which device requires substantially no maintenance or upkeep.

In one aspect of the invention, the device may comprise a flexible and resilient enclosed means that is suitably placed within the path of the flow of fluid, such as air, so that the air can flow in a flow path around the periphery of the control device, and which flow path is reduced in cross sectional area as it is desired to decrease or restrict the flow of air through the duct.

Cooperating with the flow control flexible device is a motion limiting means for the flexible means which has air passage means therein against which the flexible means moves to close off a portion of said air passage means so as to control the flow of air through the ducts.

In a further aspect, an inertia device can be employed in conjunction with a guide rod attached to a flexible chamber or balloon-like structure for damping movement thereof.

Various other objects and advantages of the present invention will be readily apparent from the following detailed description when considered in connection with the accompanying drawings froming a part thereof and which are merely exemplary.

In the drawings:

FIG. 1 is an end view of the control device embodying the present invention, partly in section;

FIG. 2 is a side elevational view of the control device shown in FIG. 1;

FIG. 3 is a view of one type of inertia device that can be used; and

FIG. 4 is a reduced size fragmentary view of an alternate type of housing.

Reference number 10 generally designates the control device of the present invention comprising a main housing or casing 12 having opposite end walls 14 and opposite side walls 16 with the lower ends of the walls providing an air inlet opening 18 receiving air from, for example, a central air conditioning system or from a dual duct hot and cold air conditioning system.

The lower ends of the walls 16 are substantially vertically extending as indicated at 20, while the upper ends or portions 22 are inclined inwardly and converge toward each other. The upper portions 22 are provided with a plurality of perforations or apertures 24 which extend over substantially their entire areas and constitute air passage means for permitting air to flow from the interior of the housing 12 to the exterior thereof and downstream to a source of use, not shown.

The upper edges of the portions 22 are spaced from each other and connected together by a substantially rectangular shaped horizontal member 26 forming the top of the housing 12.

Referring to FIG. 2, there are provided on the horizontal member 26 two longitudinally spaced, vertical stud members or rods 28 having their lower ends secured or fixed to the plate 26 by any suitable means. The upper ends of the rods 28 are threaded and have nuts 30 and 32 thereon, mounting a longitudinally extending plate 34 therebetween.

A slidable or movable rod 36 extends through the plate 34 between its ends and through the horizontal member forming the top of housing 12. The lower end of the movable rod 36 extends into an enclosed flexible and resilient member 38 that can be made of elastomeric material such as synthetic rubber or a suitable plastic material. The flexible enclosed member 38 can have the configuration of an elongated balloon as indicated in dotted lines at 40, when it is in its free state or natural position. It will be noted that the elongated member or flexible chamber 40 provides substantially large, elongated passages 42 along its outer periphery, with the flexible chamber 40 and the interior of the housing 12 defining the cross-sectional area of the elongated passages.

The lower end of the movable rod 36 is threaded and is provided with two nuts 44 and 46 with suitable washers if necessary, to secure the lower end of the rod to the lower end of the flexible enclosed member or chamber. An arcuate plate 36A is clamped between nuts 44 and 46 and engages the inside lower surface of the flexible chamber or valve member 40. The flexible chamber may have apertures therein permitting air to flow in or out.

The upper end of rod 36 is provided with a coiled spring 48 mounted thereon between an adjustable member 50 threaded on the rod 36 and an upper collar 52 disposed below the plate 34. Rod 36 can move or slide upwardly and downwardly with respect to the plate 34, and the spring 48 normally urges the rod downwardly so that the flexible chamber 40 is normally of the configuration shown in dotted lines in FIG. 1, at which time the elongated air passages through the housing 12 are in their fully open position. It is, of course, realized that the force urging the flexible chamber 40 to its fully open position can be readily adjusted by threading or moving the adjustable member 50 on the rod 36.

The flow of air through the housing 12 is shown by the arrows in FIG. 1, and the incoming air enters air inlet 18 and passes around the flexible chamber 40 and through the elongated channels 42 between the periphery or surface of the flexible chamber and the interior surface of the housing 12. Thereafter, the air passes through the perforations 24 in the upper portions 22 of the side walls and out of the housing to its source of use. As the airflow or pressure tends to increase on the upstream side of the device, that is, on the air inlet side of the device, the flexible chamber 40 will be thrust or moved from its position to the position shown in solid lines in FIG. 1 wherein the member becomes shorter and wider and tends progressively to restrict the number of perforations or air passages 24 in the upper portions 22 that are open, and thereby restricts or decreases the flow of air out of the downstream side of housing 12 to the source of use.

When the airflow or the pressure again decreases, the spring 48 will cause the rod 36 to move downwardly to its usual position and the elongated air passages 42 around the periphery of the flexible chamber 40 will again be in their fully open position.

If desired, an inertia device 55 similar to that shown in FIG. 5 of U.S. Patent No. 3,060,960 can be used. As shown in FIG. 3, rod 36 may pass through a threaded aperture in rotating means 56 similar to that described in said patent.

Thus, the present invention provides a volume control device for controlling the flow of air through a duct utilizing an enclosed member or balloon-like structure which is somewhat similar to the action of a bellows-type device for controlling the flow of air through the duct.

It is to be understood that changes can be made in the various details of construction and arrangement of the parts without departing from the spirit of the invention except as defined in the appended claims.

What is claimed is:

1. In a device for controlling fluid air in an air conditioning passage and the like, the combination including a housing having an inlet opening and a perforated air outlet means spaced therefrom forming a fluid flow path, an elongated flexible chamber disposed in said housing between said inlet and air outlet means and forming elongated air passages between the periphery of said member and said housing, said flexible chamber being reduced in diameter at one end adjacent said outlet means and larger in diameter at its other end, and means normally maintaining said chamber member in an extended position to provide a maximum cross sectional area for said elongated air passages whereby air flow pressure adjacent said inlet opening causes said elongated member to become shorter and wider so that the wall area between said narrow and wider ends progressively restricts the flow of air through said perforated air outlet means.

2. The device of claim 1 wherein said flexible chamber member has vertical rod means extending therethrough with its lower end secured to said flexible chamber member.

3. The device of claim 2 wherein said housing has opposite side walls with lower vertical portions and upper inwardly inclined portions with passages therethrough with which said flexible chamber member cooperates, and a top member extending between the upper edges of said upper portions, and a rod guide structure is mounted between said inclined portions, said rod extending through said structure.

4. The device of claim 3 wherein said rod is provided with biasing means mounted thereon for normally urging said flexible chamber member downwardly in said housing.

5. The device of claim 3 wherein said flexible chamber member comprises the configuration of an elongated inverted top shape when disposed in its normally downward position, and is of a shorter and wider configuration, and decreases the cross sectional area of said elongated flow passages, when the air pressure against its lower end increases.

6. The device of claim 2 wherein an inertia device is connected to said vertical rod.

References Cited

UNITED STATES PATENTS

| 3,060,960 | 10/1962 | Waterfill | 137—514 |
| 3,367,363 | 2/1968 | Hoffman | 137—539 XR |
| 3,394,769 | 7/1968 | Smith | 137—514 |

WILLIAM F. O'DEA, Primary Examiner
WILLIAM H. WRIGHT, Assistant Examiner

U.S. Cl. X.R.
98—119